United States Patent

Grajewski et al.

[11] Patent Number: 5,551,138
[45] Date of Patent: Sep. 3, 1996

[54] PROCESS FOR ENCASING ARTICLES

[75] Inventors: Franz Grajewski, Stadthagen; Horst Matzat, Garbsen, both of Germany

[73] Assignee: kabelmetal electro GmbH, Hanover, Germany

[21] Appl. No.: 465,187

[22] Filed: Jun. 5, 1995

Related U.S. Application Data

[63] Continuation of Ser. No. 210,138, Mar. 17, 1994, abandoned.

[30] Foreign Application Priority Data

Mar. 18, 1993 [DE] Germany .................. 43 08 593.8

[51] Int. Cl.⁶ ............................................. B29C 63/18
[52] U.S. Cl. ................... 29/423; 29/446; 29/869; 264/229
[58] Field of Search .................. 29/423, 424, 447, 29/859, 869, 871, 446; 264/139, 140, 230, 229, 237; 156/155, 344; 174/84 R; 439/528, 532; 62/62; 285/381

[56] References Cited

U.S. PATENT DOCUMENTS

| | | |
|---|---|---|
| 3,515,798 | 6/1970 | Sievert . |
| 3,878,978 | 4/1975 | Martinek ........................ 225/1 |
| 4,135,553 | 1/1979 | Evans et al. ................ 138/141 |
| 4,388,970 | 7/1982 | Krackeler et al. ........... 29/423 X |
| 4,487,643 | 12/1984 | Ellett ........................ 156/344 X |
| 4,585,607 | 4/1986 | Krackeler et al. ........ 156/344 X |
| 4,883,925 | 11/1989 | Graf ............................ 174/84 R |

FOREIGN PATENT DOCUMENTS

| | | | |
|---|---|---|---|
| 530952 | 3/1993 | European Pat. Off. | ........ 174/84 R |
| 0541000 | 5/1993 | European Pat. Off. . | |
| 0547656 | 6/1993 | European Pat. Off. . | |
| 0547667 | 6/1993 | European Pat. Off. . | |
| 2422763 | 11/1979 | France . | |
| 2647122 | 4/1978 | Germany . | |
| 3943296 | 7/1991 | Germany . | |

*Primary Examiner*—S. Thomas Hughes
*Attorney, Agent, or Firm*—Ware, Fressola, Van Der Sluys & Adolphson

[57] ABSTRACT

A process for encasing articles, particularly encasing cable splices, cable termination, a radially expanded tube made of a rubbery elastic material is positioned on the article. The tube is maintained in the expanded condition by a tension medium in the form of a plastic tube attached to the outer surface of the tube. The attachment between the surface of the tube and the tension medium is removed for the purpose of resetting the tube. The resetting is accomplished by cooling the plastic tube to a sub-ambient temperature thereby destroying the plastic tube.

9 Claims, 1 Drawing Sheet

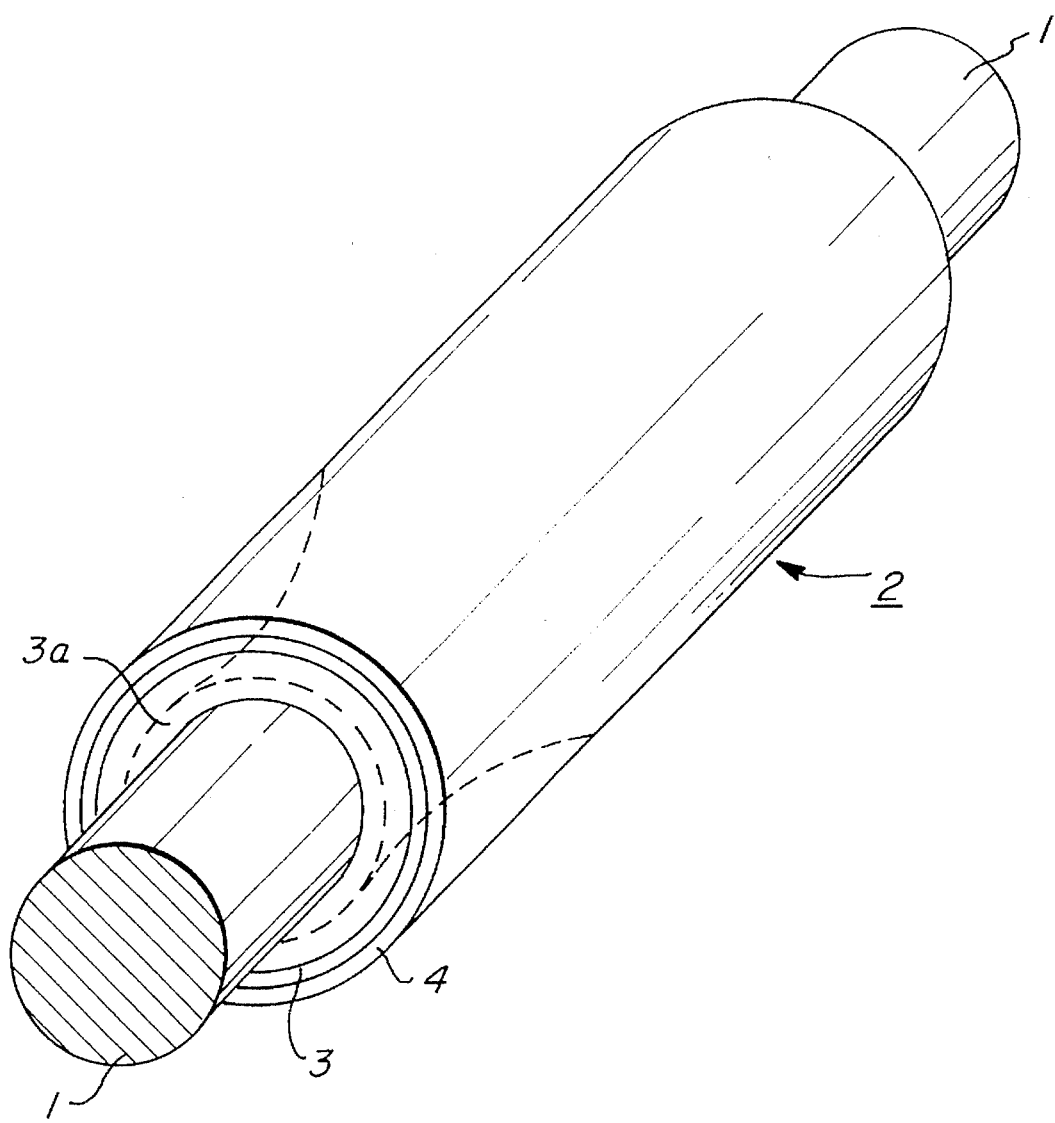

PROCESS FOR ENCASING ARTICLES

This is a continuation of application Ser. No. 08/210,138 filed on Mar. 17, 1994, now abandoned.

BACKGROUND OF THE INVENTION

The present invention generally relates to a process for encasing articles and, in particular, relates to one such process wherein a tension medium is cooled to a sub-ambient temperature.

Cold-shrinking products for encasing articles are most frequently used whenever heat or open flames are undesirable. One particular application for such cold-shrinking products is in the encasement of cable splices and cable termination.

In general, cold-shrinking products are known, for example, from U.S. Pat. No. 3,515,798. Therein, a product is discussed wherein a wire helix is placed inside a radially expanded hose made of a rubbery elastic material to maintain the hose in the expanded condition. Upon removal of the wire helix the radially expanded hose shrinks onto the article to be encased.

A hose made of a cross-linked elastomer insulation material is discussed and described in DE-OS 26 47 122. Therein the hose is kept in the expanded condition by a tension medium applied to the outer surface of the hose. The tension medium is bonded to the surface of the expanded hose, but can be loosened or removed from the hose surface for the purpose of shrinking. In order to remove the tension medium, the bond between the hose and the tension medium can be removed, e.g. by use of a solvent that dissolves the bonded connection. However, the use of many such solvents during such an installation procedure is, in most cases, excluded because of environmental considerations.

Alternatively, the tension medium can be removed from the surface of the expanded hose by, for example, shattering or by peeling it off in strips. In the latter case, a layer of a thermoplastic material is extruded over the hose in the form of a tube-like sheath, the sheath is formed of a hard plastic selected for the purpose of shattering, or has predetermined helical breaking points located in the surface thereof for the purpose of peeling.

The use of tension media made of hard brittle plastic severely limits the application thereof because very often the article to be encased is not flexible. Furthermore, there is the additional inherent danger of the involuntary destruction of the tension medium, e.g. due to an accidental impact. Such an involuntary destruction renders the article unusable.

The subsequent incorporation of the predetermined breaking points is an additional work step making the article more expensive. Further, in both cases, the article must be processed, after it has been placed in the shrinking position, which requires the use of both hands by the installer, in each case.

Consequently, it is highly desirable to provide a process for encasing an article that obviates the above-identified difficulties associated with conventional processes and which is cost effective

SUMMARY OF THE INVENTION

Accordingly, one object of the present invention is to provide a process that overcomes the above-recited difficulties associated with conventional cold-shrinking processes.

This object is accomplished, at least in part, by a process for encasing articles including a step wherein a tension medium is cooled to a sub-ambient temperature. In one application the process is used for protecting cable splices and cable ends, wherein a radially expanded tube made of a rubbery elastic material is placed on the article. The tube is maintained in the expanded condition by a tension medium in the form of a plastic tube attached to the outer surface of the tube, and the attachment between the surface of the tube and the tension medium is removed to reset the tube. In the preferred embodiment, the removal of the tension medium includes the step of cooling the plastic tube to a temperature below the ambient temperature, which destroys the plastic tube.

The essential advantage of the invention is that the cooling of the plastic tube makes the plastic tube so brittle, or loaded with internal stresses, that the plastic tube shatters by itself, or with very little mechanical force, such as rapping with a hard object, for example, a screwdriver or alternatively by squeezing it with pliers. It is preferred that plastic which is not brittle when molded at the usual ambient temperatures (0°–30° C.) be used for the plastic tube. Such an embodiment ensures, that the undesired or accidental destruction of the plastic tube cannot occur during transportation and handling.

Other objects and advantages of the present invention will become apparent to those skilled in the art from the following detailed description read in conjunction with the appended claims and the drawing attached hereto.

BRIEF DESCRIPTION OF THE DRAWING

The drawing, not drawn to scale, includes the single FIG. 1 which is a perspective view of an article being covered by a process incorporating a tension medium and embodying the principles of the present invention.

DETAILED DESCRIPTION OF THE INVENTION

An electrical cable having a joint, not shown in the Figure, that is to be insulated and/or protected, is designated by the numeral 1. To that effect and before the joint is made, a tube-shaped sheath 2 having an inside diameter that is larger than the largest outside diameter of the cable 1 or the joint, is placed over a cable 1.

The sheath 2 includes a hose 3 formed from a rubbery elastic material, such as, for example, neoprene. The outer surface of the hose 3 is solidly attached to a tension medium 4, that maintains the radially expanded hose 3 in the expanded condition. In the preferred embodiment, the tension medium 4 is a plastic tube. In fact, nearly all conventional thermoplastic materials may be used for the plastic tube 4.

After the sheath 2 has been positioned over the joint, the sheath 2 is sprayed with a cooling spray, e.g. from a pressure tank containing liquid gas, e.g. liquid air or liquid carbon dioxide. In some thermoplastic materials, the cooling creates such strong internal stresses that the plastic tube 4 shatters by itself. Nonetheless, in thermoplastic materials that do not shatter by themselves, the internal stresses created are such that the application of a slight mechanical load, for example, a light rap with a tool is sufficient to cause the cooled plastic tube 4 to shatter. Naturally, care must be taken during the cooling step to prevent the hose 3 from shattering as well.

The broken line in FIG. 1 indicates that a part of the hose 3a has already shrunk onto the cable 1. In one particular embodiment, the sheath 2 is produced by extruding a plastic polyvinyl chloride or polyethylene tube 4 over a nearly endless hose 3. In one particular embodiment of the process, an adhesive is applied to the outside surface of the hose 3 prior to the extrusion of the hose 3. The use of such an adhesive helps to retain the hose 3 to the tension medium 4 and hence retain the expanded condition thereof.

After the extrusion, the sheaths 2 are cut off from the manufactured double tube in the required length. The sheaths 2 are then heated to the deformation point of the plastic tube 4 and expanded in the radial direction. Typically, the sheath 2 will be expanded by about 100%. This can be achieved by use of a mandrel over which the sheath 2 is drawn. The sheath 2 is then allowed to cool to ambient temperature in the expanded condition. After the mandrel is removed, the hose 3 is held in the expanded condition by the plastic tube 4, and is ready to be used.

Although the present invention has been discussed herein with respect to one or more specific embodiments it will be understood that other arrangements or configurations may also be used that do not depart from the spirit and scope of the present invention. Hence, the present invention is deemed limited only by the appended claims and the reasonable interpretation thereof.

What is claimed is:

1. A process for encasing an article, said process comprising the steps of:

placing a radially expanded tube of a rubbery elastic material over said article, maintaining said tube in said expanded condition by a tension medium attached to an outer surface of said tube, said tension medium being molded of a material which is not brittle at ambient temperatures, maintains said tube in said expanded condition at said ambient temperatures, and becomes brittle when cooled below said ambient temperatures, and removing said tension medium by cooling said tension medium to a sub-ambient temperature such that said tube shrinks about said article, said tension medium being cooled to said sub-ambient temperature by applying a cooled medium on said tension medium.

2. The process according to claim 1, wherein said removing step includes applying said cooled medium by blowing said cooled medium on said tension medium.

3. The process as claimed in claim 1, wherein said removing step includes spraying said tension medium with liquid gas or dry ice.

4. The process as claimed in claim 1, wherein said cooling continues until said tension medium shatters due to internal stresses.

5. The process as claimed in claim 1, further including the step of exposing said tension medium to a mechanical load subsequent to said cooling.

6. The process as claimed in claims 1, wherein said cooled medium is a cooling spray, and wherein said removing step includes applying said cooled medium by treating said tension medium with said cooling spray.

7. The process as claimed in claim 1, further including the step of eliminating any attachment between said radially expanded tube and said tension by destroying the adhesive between said radially expanded tube and said tension medium through embrittlement of said tension medium due to cooling.

8. The process as claimed in claim 1, further including the step of eliminating any attachment between said radially expanded tube and said tension by destroying the adhesive between said radially expanded tube and said tension medium through radial shrinking of said tension medium due to cooling.

9. The process as claimed in claim 1, wherein said ambient temperatures are between 0° C. and 30° C.

* * * * *